July 24, 1962
J. TUDGE
3,046,424
DYNAMO ELECTRIC MACHINES
Filed June 27, 1960
3 Sheets-Sheet 1
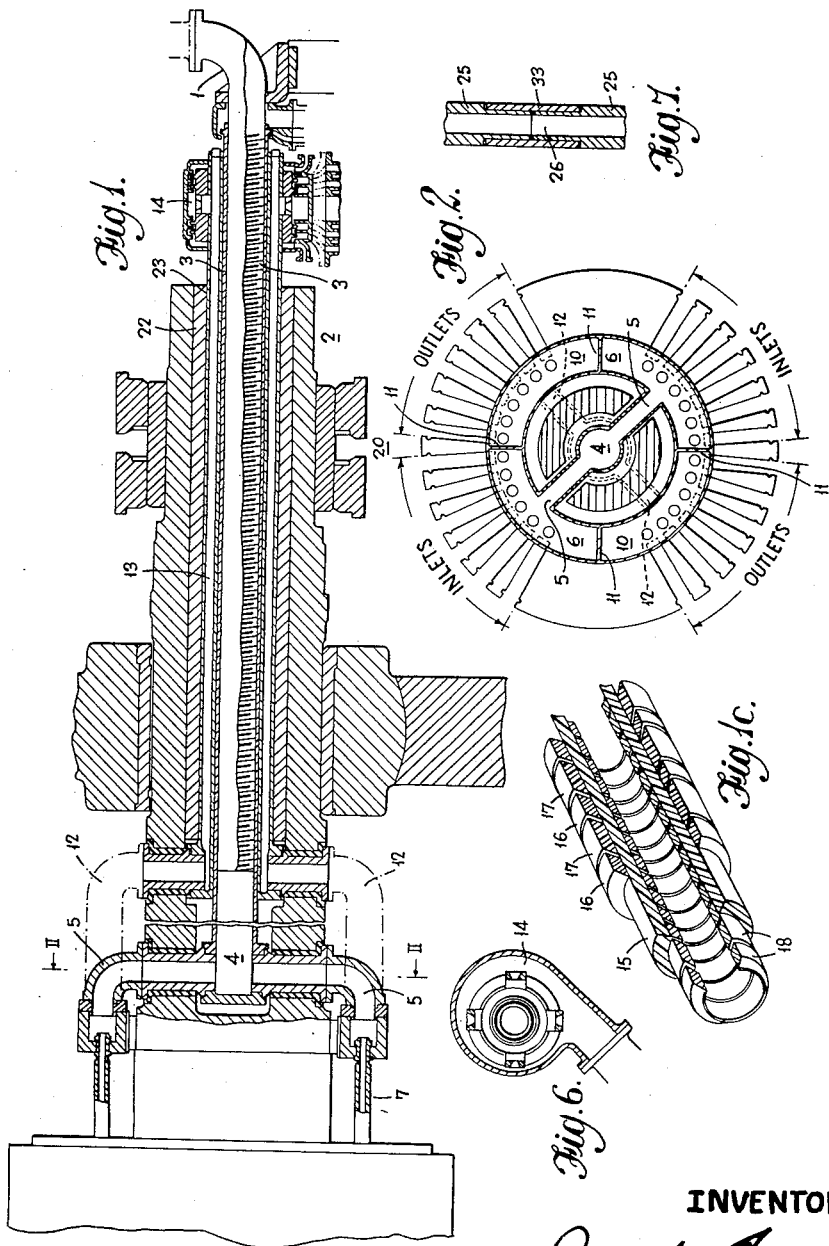
INVENTOR
Joseph Tudge
BY
Larson and Taylor July 24, 1962 J. TUDGE 3,046,424
DYNAMO ELECTRIC MACHINES
Filed June 27, 1960 3 Sheets-Sheet 2
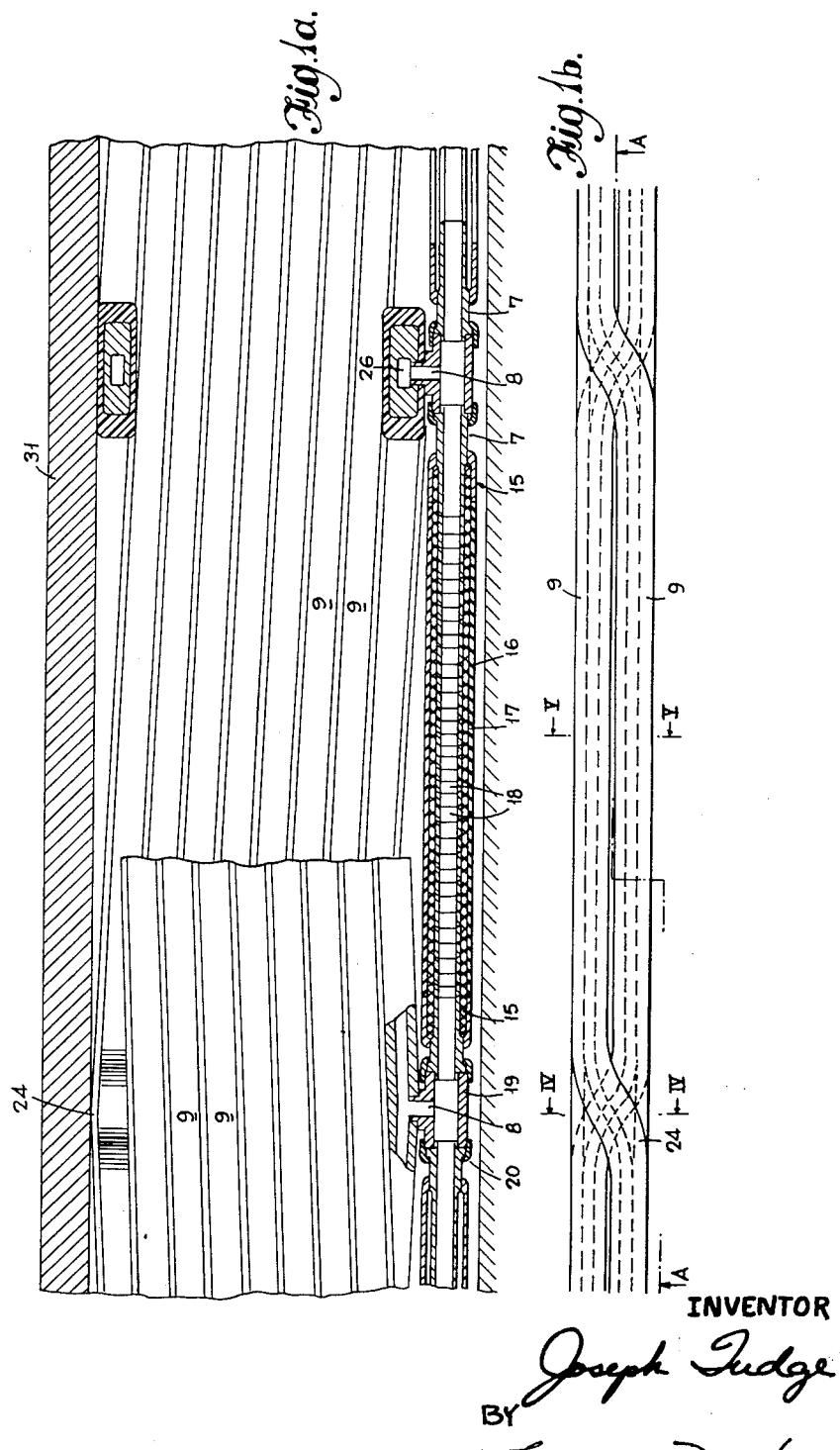
INVENTOR
Joseph Tudge
BY
Lawson and Taylor July 24, 1962 J. TUDGE 3,046,424
DYNAMO ELECTRIC MACHINES
Filed June 27, 1960 3 Sheets-Sheet 3
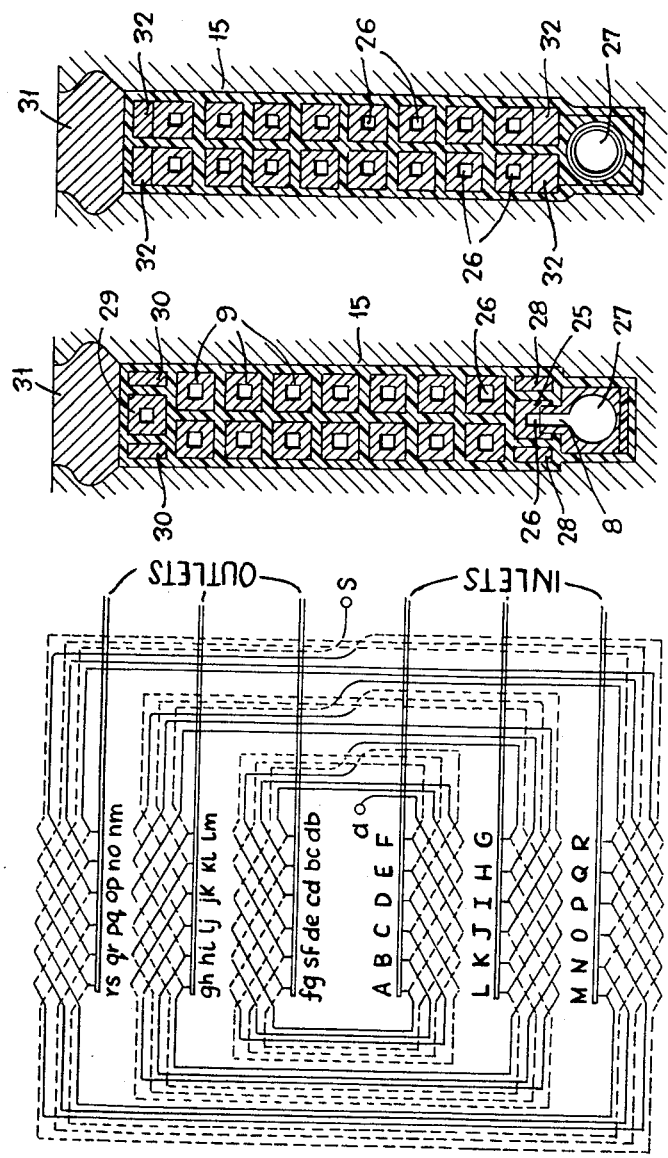
INVENTOR
Joseph Tudge
BY
Larson and Taylor United States Patent Office 3,046,424
Patented July 24, 1962

3,046,424
DYNAMO ELECTRIC MACHINES
Joseph Tudge, Walkden, Manchester, England, assignor to Associated Electrical Industries Limited, London, England, a British company
Filed June 27, 1960, Ser. No. 39,148
Claims priority, application Great Britain June 29, 1959
5 Claims. (Cl. 310—61)

This invention relates to dynamo electric machines and more particularly to the rotors of turbo alternators.

One of the chief limitations in producing turbo alternators having ratings exceeding 500 mw. without substantially increasing the weight is the temperature of the rotor copper winding. Hitherto, it has been the practice to circulate hydrogen at elevated pressures in direct contact with the rotor windings. It is also known to cool stator windings by circulating a liquid, such as water, through hollow conductors. However, in the case of a rotor one of the difficulties which exists is to limit the D.C. leakage currents which exist in the water columns or ducts feeding the conductors. Furthermore, in order to reduce the friction head and limit the temperature rise of the water, it is necessary that the water should only flow through the conductors for a short distance.

The main object of the invention is to provide an improved arrangement which substantially satisfies these requirements.

According to the present invention an electrical turbo alternator rotor has a winding formed of conductors having longitudinal passages and formed into a plurality of coils each coil comprising two coil sides in respective slots which are spaced apart and the conductors of each coil side being transposed within the slot so that each in turn occupies the bottom position in the slot together with ports connecting said conductor passages of one coil side when in the bottom position with an inlet manifold extending axially of the rotor and adjacent the conductor slot and ports connecting each of the conductor passages of the associated coil side with a similar discharge manifold, said manifolds extending through the rotor core parallel to the slots, and means for circulating cooling liquid from each inlet manifold through the conductors associated with that manifold to discharge into the manifold associated with the other coil side of the coil in question.

Each of the input inlet manifolds may be connected to a liquid supply duct extending through the rotor shaft and similarly each of the output manifolds may be connected to a liquid discharge duct also extending through the rotor shaft.

The transposition of the rotor conductors may be in the manner employed in so-called Roebel stator bars.

In such an arrangement the conductors are arranged in the slot in two stacks side by side, the conductors in one stack slope downwards to a bottom position, then bend sideways so as to transfer to the other stack and then slope upwards, each of the conductors in turn occupies the bottom position in the slot but at different locations along the slot.

The above description refers for simplification to a slot on top of the rotor so that the top conductor is radially outermost and the bottom conductor radially innermost.

The manifolds are preferably in sub-slots underneath (i.e. radially inside of the conductor slots). Alternatively, they could extend between the conductor slots.

In order that the invention may be more clearly understood reference will now be made to the accompanying drawings, in which:

FIG. 1 is a longitudinal section of one end of a rotor showing the liquid supply and discharge connections.

FIG. 1a is a longitudinal section through a slot and is a section on A—A of FIG. 1b.

FIG. 1b is a plan view of the conductors in a slot showing the transposition.

FIG. 1c is a cut-away perspective view of the hose forming a manifold.

FIG. 2 is a cross sectional view on the line II—II of FIG. 1 showing the connections between the shaft supply and discharge ducts of the corresponding sub-slots.

FIG. 3 is a diagrammatic view showing how the coils would be arranged electrically.

FIG. 4 is an enlarged cross sectional view of a slot taken on the line IV—IV of FIG. 1b.

FIG. 5 is a similar view taken on the line V—V of FIG. 1b.

FIG. 6 is a cross sectional view of the discharge volute.

FIG. 7 is a brazed joint with tubular coupler.

Referring first to FIG. 1, water flows from an overhead tank (not shown) through a stationary supply pipe 1 extending through the end of the rotor shaft 2, the outer surface of the duct is threaded at 3 to act as a screw pump to enable the highest possible head to be applied in chamber 4 without excessive leakage back through the annulus between this stationary shaft and the rotating member. Whilst this is a preferred shaft seal, other suitable shaft seals could be used; however, a method which does not involve rubbing seals with possibility of wear would be desirable.

The water then flows from the chamber 4 through two diametrically opposite radial inlet pipes 5 into diametrically opposite inlet quadrants 6 of an annulus. From the inlet quadrants of the annulus the water is distributed to each inlet coil side by way of manifolds formed in insulation hoses 7 in inlet sub-slots 8. The arrangement of radial pipes and annulus is shown more clearly in FIG. 2 and the water circuit to the coils is shown in FIG. 3.

From FIG. 3, and also FIG. 1, it will be seen that hoses forming the manifolds extend from the annulus throughout the length of the sub-slots providing communication with each conductor 9 at the cross-overs at the bottom of the coil, the conductors being transposed in each slot in a manner which will be described subsequently. All adjacent coil sides associated with one pole are inlets as far as the water is concerned and are connected to one of the inlet quadrants of the annulus and all diametrically opposite (electrically) coil sides are also inlets.

FIG. 3, which is an explanatory winding diagram, shows three coils only associated with one pole, and for simplicity and ease of tracing the circuit, each coil has only six turns, three turns deep by two stacks wide, whereas FIG. 1, and the slot sections shown in FIGS. 4 and 5, have sixteen turns, eight deep by two wide. In FIG. 3 the full lines represent the hollow conductors in that stack nearest the pole axis in the case of each coil, and the dotted lines represent the other stack. In FIG. 3 the water inlet tappings at the bottom cross-overs of the inlet coil sides are indicated by capital letters A–M and the corresponding outlets are indicated by small letters. By tracing through the circuit it will be noticed that each inlet feeds two paths each with a separate half outlet in the other coil side each at adjacent cross-overs. Thus, the inlet B is connected through the path indicated in full line with the outlet bc and through the path indicated in dotted line with the outlet ab. The two "parallel" paths taken by the water are, therefore, of slightly different lengths equivalent to the pitch of the cross-overs, but this is so short compared with the length of the path —which is about half a turn—as to be of no consequence as regards the temperature rise of the water.

It will be noticed from FIG. 3 that the middle coil has opposite handed cross-overs. The reason for this will be appreciated after tracing out the water circuit for the smallest coil when it will be noticed that the half outlet g is the half discharge from tapping G on the next coil, and likewise, with half outlet s. If now all the crossovers were of the same hand g would receive water from inlet L giving a path length and, therefore, a water temperature rise for that one particular path about twice that of the other paths. Handing each alternate coil oppositely produces substantially equal path lengths throughout the winding, this path length being half a turn and is equivalent to a single pass cooling system where water enters one end of the machine and is discharged from the other after passing through all conductors in parallel, yet a multiplicity of hose connections in the end winding, which would be impossible to accommodate and some of which would be subject to the very high pressures in the outer turns, is completely avoided.

This construction also permits a "bench-assembly" of each half-coil along with the hoses forming the supply or discharge manifold and ground insulation. Each complete half-coil can be inserted into the winding slots, as shown in FIGS. 1a, 1b, 4 and 5, and the conductors joined on the end windings electrically and hydraulically as shown in FIG. 7 by means of brazed tubular couplers.

After its passage from one half-coil into the other half-coil, the water is discharged again from the bottom crossovers into a similar discharge manifold formed by a hose lying in the sub-slot and thence to the discharge quadrants 10 of the annulus. The supply and discharge quadrants are separated by partitions 11. From the annulus the water flows through radial discharge pipes 12 into a discharge annulus 13 concentric with the supply pipe 1 and along the shaft to the volute 14, a section of which is shown in FIG. 6, there to be discharged into a tank below the rotor level from which it is pumped back into the overhead tank by an external pump.

The head, for this arrangement, to force water through the windings without producing negative pressures, is that developed by rotation of the rotor between the radius of the discharge annulus 13 and the radius of inlet chamber 4 together with the initial pressure in chamber 4 which can be supplied from the overhead tank, and resisted by the screw pump action of inlet pipe 1. Higher pressures would be available if a positive seal were used where the water enters the shaft but this would involve the problem of seal wear.

Comparing FIGS. 1 and 2 it will be observed that the ducts 5 and 12 are both shown in a vertical plane in FIG. 1 whereas actually they are displaced rotationally through 90°, as is shown in FIG. 2.

The construction of the insulation hoses for the manifolds is shown in FIGS. 1a and 1c. The hose has to withstand the pressure existing at the radius of the sub-slot which may be in the order of 1,000 p.s.i. at normal speed and possibly 1,500 p.s.i. at overspeed. The hose material should firstly be impervious to water and have flexibility to "give" under thermal expansion of the winding. A suitable material is P.T.F.E. (polytetrafluoroethylene) as indicated by the reference 15 but it will be necessary to have external metal reinforcing ferrules 16 separated by narrow but strong insulation ferrules 17. Secondly, the hose will require internal reinforcing bushes 18 to prevent collapse due to rotation should the rotor at some stage run without water at elevated temperatures. These bushes must be of strong insulation having water impervious properties. A suitable material is P.C.T.F.E. (polychlorotrifluoroethylene) and the ends of the bushes and ferrules can be chamfered to give the complete hose some flexibility. Thirdly, although the design has been arranged to accommodate long hoses to reduce leakage currents particularly those between the winding and the annulus formed by quadrants 6 and 10, some of which have half the rotor voltage across their ends, it may be necessary to provide an extension to the end of the insert 7 which will act as a guard ring against corrosion of the effective part of the insert under the crimping ferrule 15. A suitable material for these inserts, to reduce the extent of electrolytic attack, would be stainless steel.

The electrical leads to the collector 20 (FIG. 1) could be of the conventional kind passing through holes in the solid section of the shaft, in which case water discharging from point "a" at the beginning of the electrical circuit could be conveyed to an outlet chamber 10 of the annulus through an insulating hose, and the water entering the end of the electrical circuit at a point similar to "S" (FIG. 3) could be delivered also through a hose from an inlet quadrant 6 of the annulus. Alternatively, the leads to the collector could be of hollow construction and water-cooled by making appropriate water connections at the collector end of the leads. Water-cooled leads would also apply if the collector is of the mercury contact type or whether the exciter is of the A.C. type having rotating rectifiers mounted on the shaft. The solid or water-cooled leads could occupy the space, if it is so desired, of the cylindrical packer 22.

The water pipes conveying water to annulus inlet quadrants 6 and the annulus itself is insulated from the rotor shaft to permit insulation resistance measurement of the rotor main ground insulation 23 to be taken without completely draining the water.

The above describes a direct water-cooled rotor having the equivalent of a single pass system, the water being discharged after its passage through each half turn. On rotors of intermediate rating it may only be necessary to discharge the water after its passage through one complete coil in which case the conductors would not require transposition. The turns could progress up one stack, crossing over to the adjacent stack on the end windings, and back to the bottom where another cross-over can be made to the coil in the next slot. Hose connections for water can then be made at these bottom cross-overs in the end winding where the pressure is least. A further alternative is to have one stack only of conductors in each slot, the turns progressing up one slot crossing over at the top to the adjacent slot and back to the bottom where water hose connections can be made, again when the pressure is least. Intermediate water tappings could be made part way up the slot on small diameter rotors providing the pressure is not excessive for the hose.

As is shown more clearly in FIGS. 1a and 1b the conductors in the near stack shown in the left slope upwardly from left to right when they reach the uppermost position, e.g. at 24, they are bent horizontally into the further stack and then slope downwardly. Similarly, as each conductor in the further stacks reaches the bottom of the slot it will be bent horizontally into the near stack. Thus, there is a progressive transposition of the conductors in the slot each successively reaching the bottom position.

FIG. 4 is a section through a transposition point such as at the section line IV—IV of FIG. 1b in which the conductor 25 is consequently in the mid position in the slot. The longitudinal conductor passage 26 is coupled with the manifold 27 through the port 8.

28 are spacer blocks on opposite sides of the conductor 24. At the top of the slot a conductor 29 is similarly undergoing transposition but in the opposite direction to the conductor 25 and is held in position by spacer blocks 30. The reference 31 represents the usual wedge holding the conductors in the slot.

FIG. 5 shows a similar view but on the section line V—V of FIG. 1b which is in between the transposition points. Thus, there is no connection between the passages 26 and the manifold. Spacer blocks 32 are inserted at the top and bottom of the slot.

The construction shown permits a "bench assembly" of each half-coil together with its hoses and earth insulation.

Each complete half-coil can be inserted into the winding slots and the conductors joined electrically and hydraulically as shown in FIG. 7 by means of brazed tubular couplers 33 inserted over the reduced ends of the conductors 25.

What I claim is:

1. An electrical alternator rotor comprising a core, around the periphery of which are surfaces defining conductor slots extending axially of the rotor, a plurality of coils, each coil comprising two coil sides extending through respective slots which are spaced apart around the rotor and each comprising a plurality of hollow conductors, each conductor comprising at least one portion which is radially inside the other conductors in the same slot, surfaces defining a plurality of cavities extending axially of the rotor, at least one inlet manifold and at least one discharge manifold in said cavities, ports between each discharge manifold and the interior passages of the radially innermost portions of said hollow conductors and ports between each inlet manifold and said interior passages.

2. An electrical alternator rotor as claimed in claim 1 together with at least one duct extending through the rotor shaft, and connections between each duct and at least one of said manifolds.

3. An electrical turbo alternator rotor comprising a core, around the periphery of which are surfaces defining conductor slots extending axially of the rotor, a plurality of coils, each coil comprising two coil sides which are spaced apart and which are formed of hollow conductors, part of each of which is inside a conductor slot, which part has at least one portion which is radially inside the other conductors in the same slot, surfaces defining a plurality of sub-slots which are radially inside the conductor slots and which extend axially of the rotor, at least one discharge manifold and at least one inlet manifold in said sub-slots, ports between each discharge manifold and the interior passages of radially innermost portions of said hollow conductors and ports between each inlet manifold and said interior passages.

4. An electrical turbo alternator rotor comprising a core, around the periphery of which are surfaces defining conductor slots extending axially of the rotor, a plurality of coils, each coil comprising two coil sides which are spaced apart and which are formed of hollow conductors, part of each of which is inside a conductor slot, which parts form at least one so-called Roebel stator bar, i.e. each conductor has a downward sloping portion, which portions form a stack, and each has an upward sloping portion, which portions form a second stack, and each has a connection portion which joins said upward sloping portion to said downward sloping portion and which thus forms a connection between the first mentioned stack and the second mentioned stack, surfaces defining a plurality of cavities extending axially of the rotor, at least one inlet manifold and at least one discharge manifold in said cavities, ports between each discharge manifold and the interior passages of said connecting portions of said hollow conductors and ports between each inlet manifold and said interior passages of said connecting portions of the hollow conductors.

5. A turbo alternator rotor as claimed in claim 4, having tow coolant paths which originate from each port associated with an inlet manifold and which terminate at two of the ports associated with a discharge manifold, and two coolant paths which terminate at each of the ports associated with the discharge manifold, which paths originate from two of the ports associated with an inlet manifold.

References Cited in the file of this patent

UNITED STATES PATENTS

| 2,821,641 | Ringland | Jan. 28, 1958 |
| 2,898,484 | Krastchew | Aug. 4, 1959 |
| 2,903,609 | Waddington | Sept. 8, 1959 |

FOREIGN PATENTS

| 1,084,689 | France | July 13, 1954 |